March 13, 1973  L. G. DE VINCK  3,720,490
APPARATUS FOR JOINING WALL TILES
Filed March 24, 1969  7 Sheets-Sheet 5
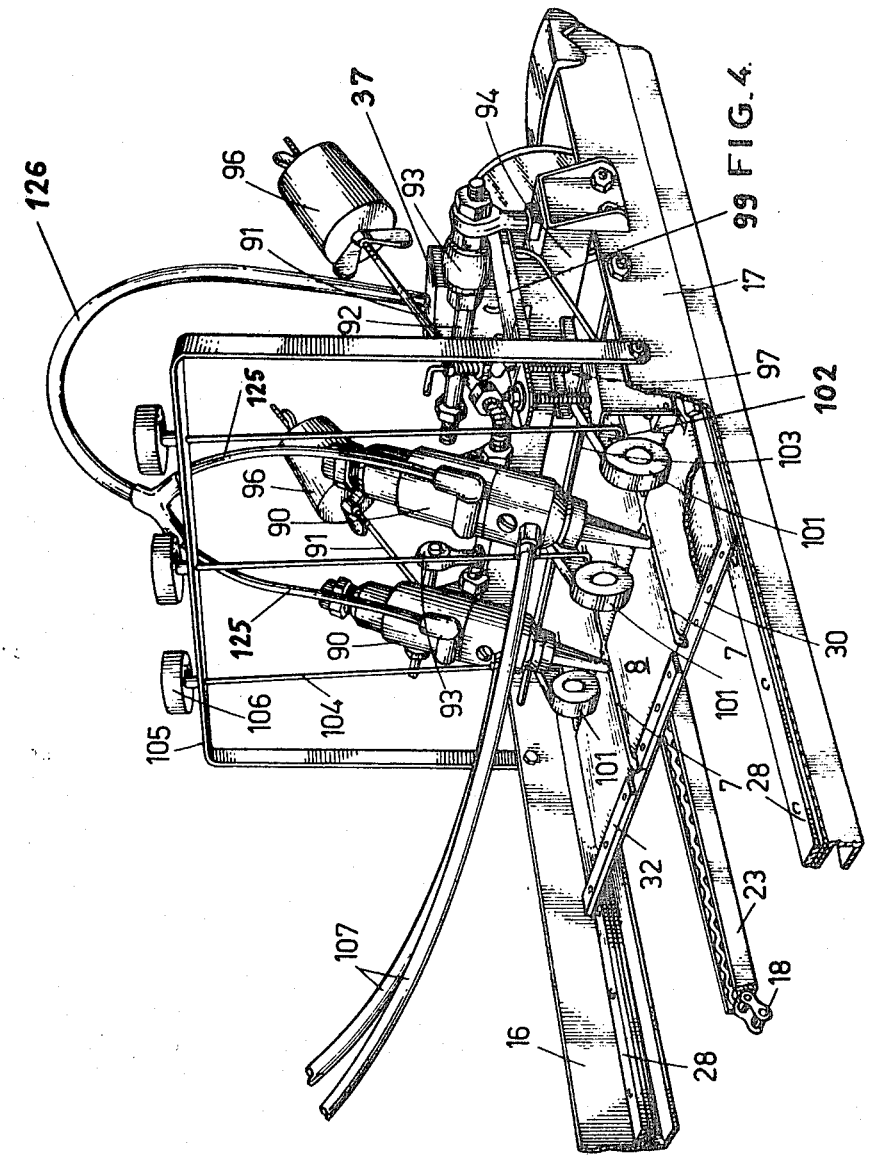
INVENTOR.
Luc Gaston De Vinck
BY Holman, Glascock,
Downing & Seebold
ATTORNEYS

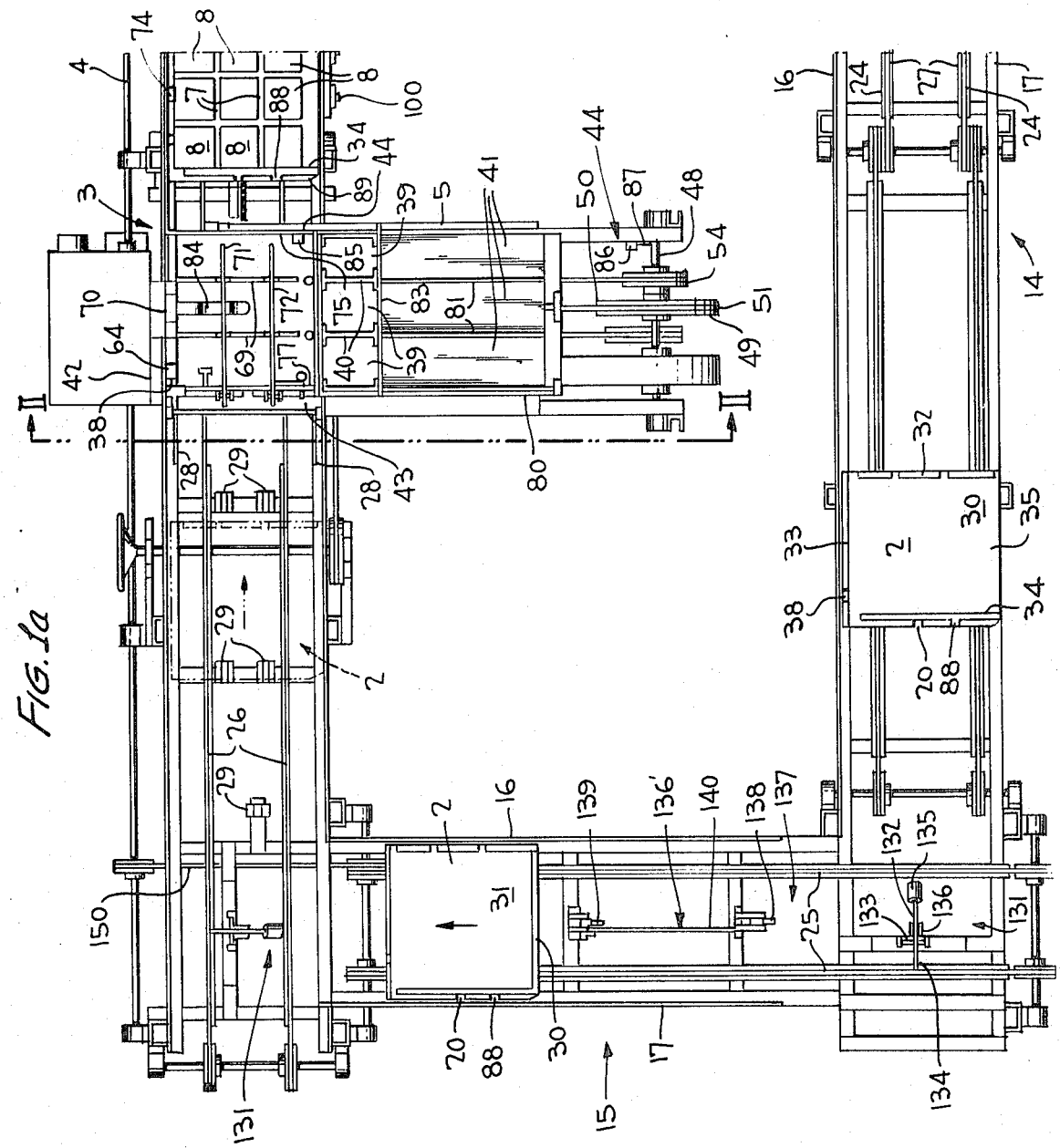

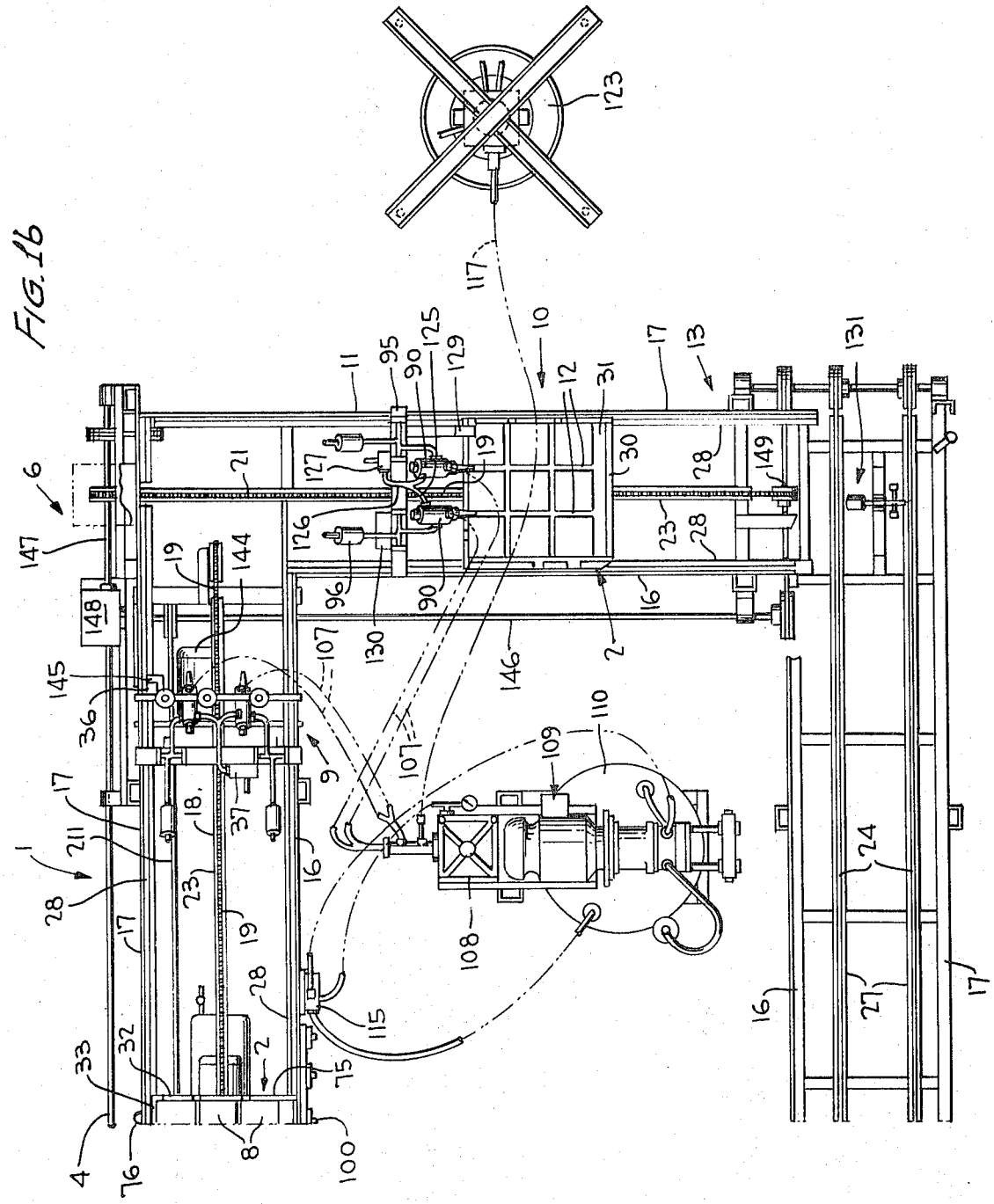

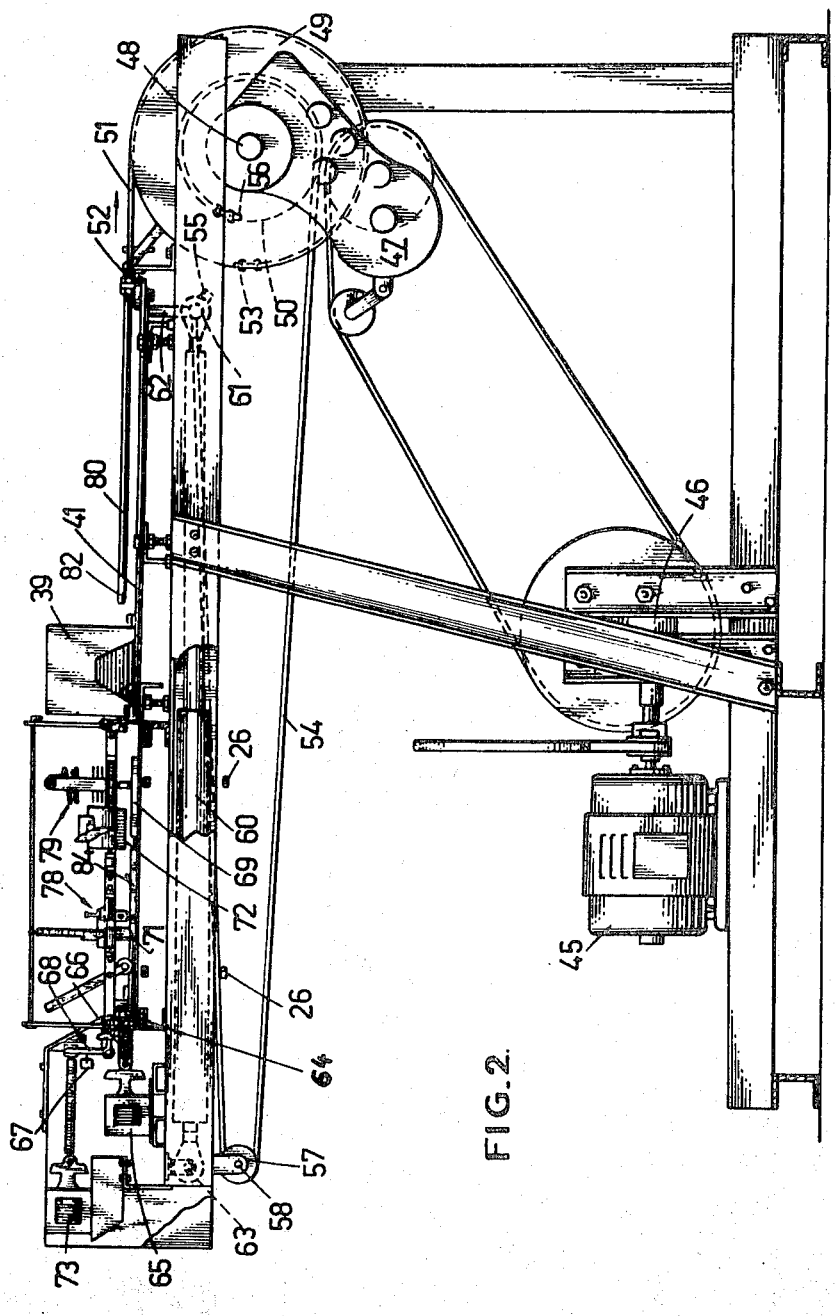

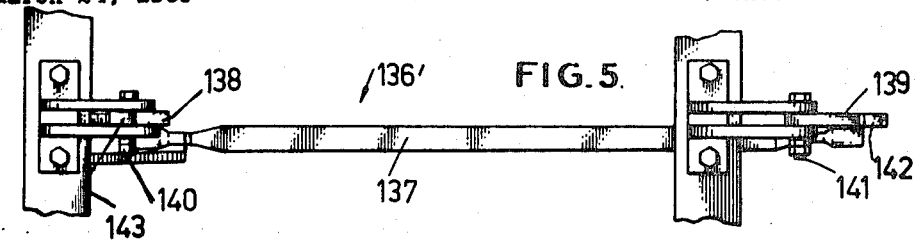
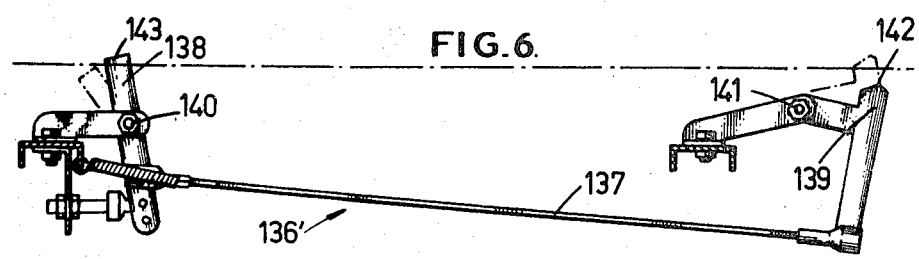
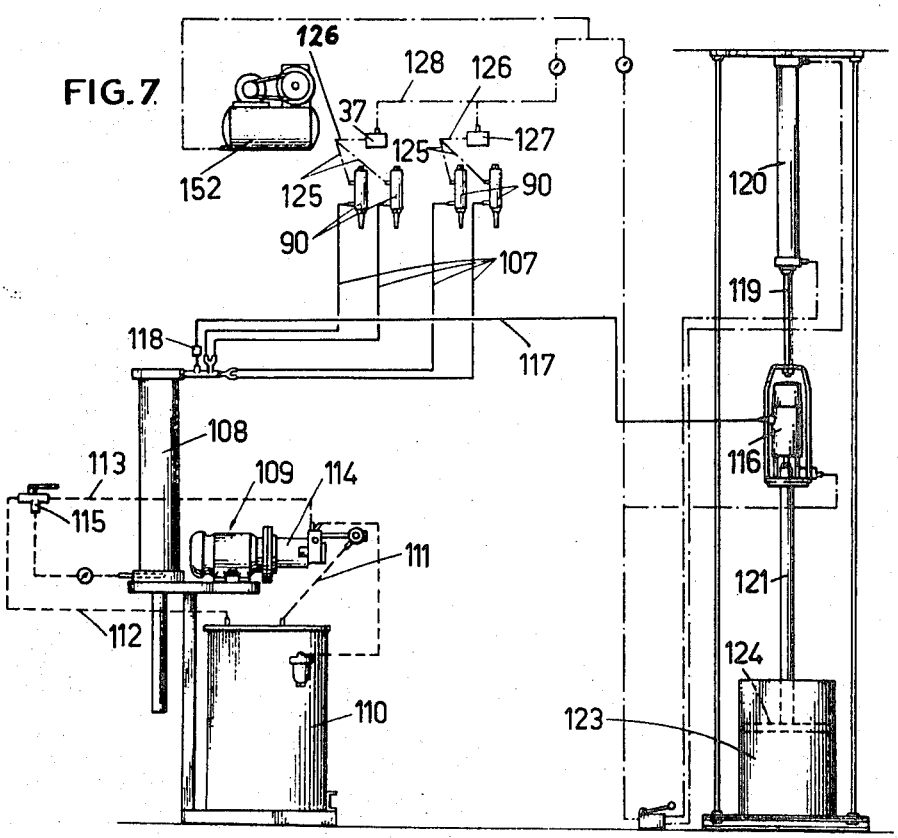

March 13, 1973  L. G. DE VINCK  3,720,490
APPARATUS FOR JOINING WALL TILES
Filed March 24, 1969  7 Sheets-Sheet 7

INVENTOR.
LUC GASTON DE VINCK
BY Holman, Glascock
Downing & Seebold
ATTORNEYS

United States Patent Office 3,720,490
Patented Mar. 13, 1973

3,720,490
APPARATUS FOR JOINING WALL TILES
Luc Gaston de Vinck, Hunsberg, Merchtem, Belgium, assignor to Villeroy & Boch Keramische Werke KG, Mettlach, Germany
Filed Mar. 24, 1969, Ser. No. 809,651
Claims priority, application Belgium, Mar. 26, 1968, 56,336
Int. Cl. B29c 27/00
U.S. Cl. 425—3
36 Claims

ABSTRACT OF THE DISCLOSURE

The specification describes an improved title structure in the form of a sheet of tiles connected together at their edges ready for mounting on a wall. The specification also described an apparatus for assembling tiles to form such sheets. The apparatus comprises a conveying system which is rectangular in plan and on one side is provided with means for ejecting tiles on to a rectangular support on the conveying system. On this same side of the conveying system and on the next following side there are means for placing jointing material in gaps or joints between the tiles on the support.

---

The present invention relates to tiles for cladding walls and more particularly to a particular form of tile structure and a method and apparatus for manufacturing such a structure.

One object of the present invention is to simplify a laying of tiles on wall surfaces and in particular to make such an operation easy for unskilled persons to perform.

The present invention in accordance with one aspect consists in a sheet for attachment to a wall for cladding the wall, the sheet comprising a number of tiles with joints between them, and a plastics material binding agent filling the joints.

The binding agent can be a thermo-plastic material such as a polyester. The binding agent can alternatively be polyvinyl chloride and can be reinforced by glass fibers.

The rear face of the sheet can have a covering layer of adhesive. The adhesive can be in a dry state and adapted to be made ready for use by treatment with a solvent. The adhesive can be covered with a removable layer for protecting it. The joints between the sheets can be filled by means of a synthetic resin tape of suitable cross-section.

The invention also consists in an apparatus for assembling tiles to form a sheet of tiles comprising a generally plane support, means for placing binding agent in gaps between the tiles on the support, and means for producing relative movement between the filling device and the tiles along the gaps. The apparatus can comprise means for moving the support in relation to the filling means.

Furthermore the invention also consists in a method of connecting the side edges of tiles to form a sheet, comprising the steps of laying the tiles together in a substantially coplanar arrangement with joint gaps between them, the gaps forming two intersecting sets, moving the tiles in a direction parallel to one set of gaps past at least one source of binding agent which is placed adjacent to gaps in the one set, and then moving the tiles in a direction parallel to the other set of joint gaps past at least one source of binding agents which is placed adjacent to gaps in the last-mentioned set.

An apparatus for carrying out the method as defined in the last preceding paragraph may comprise plane supports for carrying the tiles, guide means extending in a horizontal direction for moving the supports horizontally, transport or conveyance means associated with the guide means for moving the supports along the guide means, running in at least two different horizontal directions and being arranged to pass the supports from the loading means and then back to the loading means, the loading means serving for laying the tiles in arrays in which they are adjacent to each other in rows running in at least two directions, the supports being moved on the guide means in such a manner that a given side of each support remains parallel to a given horizontal axis, as opposed to being turned in a horizontal plane in relation to the axis, and stationary devices for placing binding agent in gaps between the tiles on the supports.

The guide means can be arranged to pass the supports with the tiles on them along a path which is rectangular in plan, the device being arranged at one side of this rectangle. The apparatus may further comprise a device for placing binding agent in joints between the tiles on the supports, this joint filling device being arranged on the same side of the rectangle of the guide means as the loading device, on the next following side of the rectangle, a second means for placing binding agent in the joints between the tiles on the supports, the first and second devices for placing binding agent into the joints being arranged respectively to place binding agent in two sets of joints, the two sets of joints being perpendicular to one another.

In accordance with a preferred feature of the invention the guide means comprises pairs of parallel pieces of angle girder with horizontal and vertical limbs, the horizontal limbs of the two pieces of girder in each pair extending towards each other, the pieces of angle girder being spaced apart by a distance substantially equal to the width of the supports transported on them.

The transport means may comprise endless belts arranged between the pieces of angle girder and the apparatus can further comprise entrainment means on the chains which extend above the pieces of angle girder and serve for engaging the supports.

The upper runs of the chain may be contained in pieces of girder of U cross-section.

In accordance with a further feature of the invention the transport means may further comprise pairs of endless belts arranged between such pieces of angle girder parallel to them at such a height that upper runs of the belts are at a higher level than upper faces of horizontal limbs of the pieces of angle girder.

One embodiment of the invention is now described with reference to the accompanying drawings.

FIGS. 1a and 1b are plan views of an apparatus in accordance with the invention.

FIG. 2 is a section on the line II—II of FIG. 1a showing the loading device in side view.

FIG. 4 is a perspective view, partially in section, of means for introducing binding agent into joints.

FIG. 5 is an enlarged plan view of parts of the apparatus as shown in FIGS. 1a and 1b.

FIG. 6 is a side view of the parts shown in FIG. 5.

FIG. 7 is a diagrammatic view of the conveying means for the binding agent.

In all figures of the drawings like reference numerals denote like parts.

Figure 3:
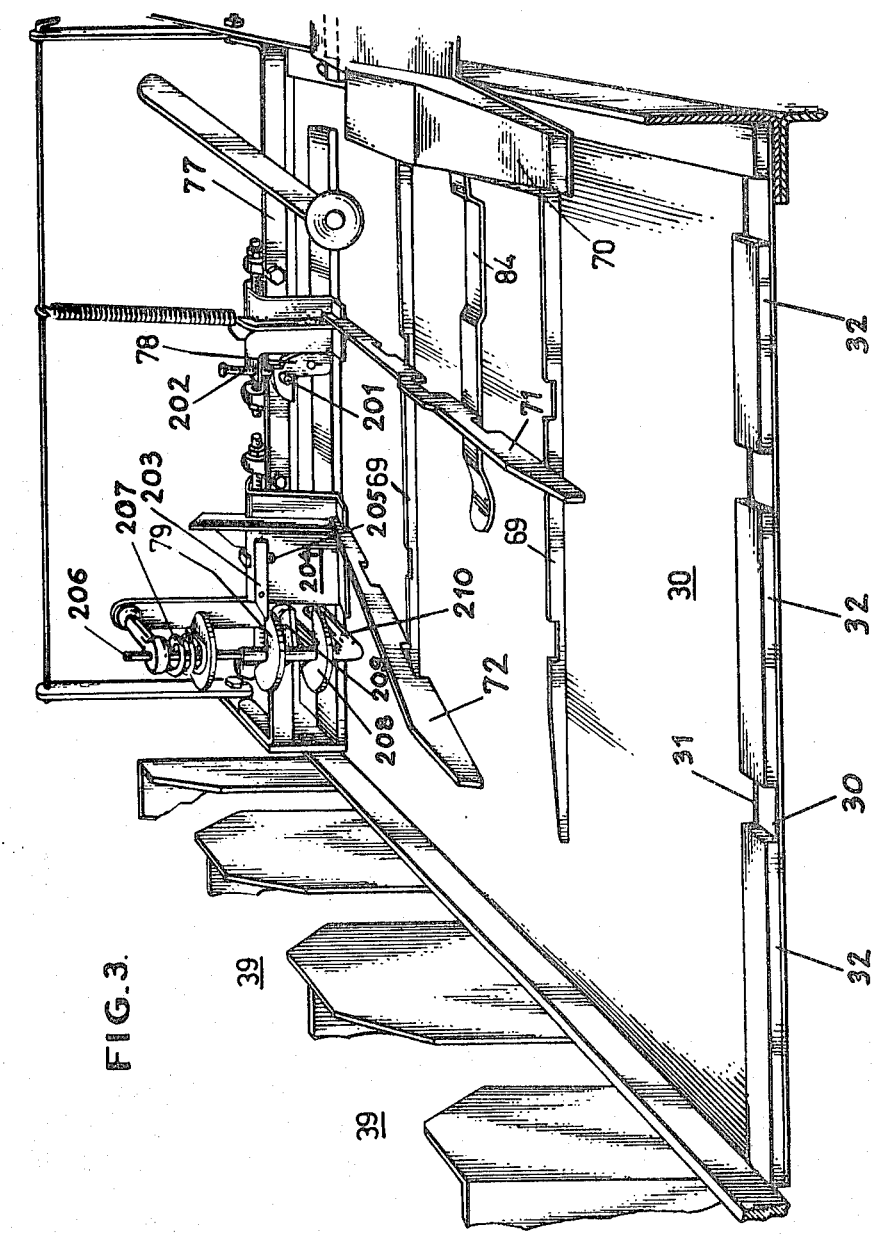
FIG. 3 shows parts of the loading device, located at the loading station, in perspective view.

The apparatus shown in the figures is intended for the produciton of square sheets each made up of nine square tiles.

The apparatus comprises a rectangular frame 1 or guide means which is set at the height of about a meter from the ground, that is to say, generally about the height of a table. On the frame supports 2 are moved round in a rectangular path along the sides of the frame. The supports have the tiles placed on them and the tiles are joined together while in position on the supports. Near the centre of the side 4 of the frame there is a loading station 3 for loading supports 2 with the tiles. The loading station 3 is provided with a loading device 5. After being loaded the supports 2 carrying the tiles on them then move along the side 4 of the frame to the right until they reach its end 6. During this movement the joints or gaps 7 parallel to the side 4 and between the tiles 8 to be assembled to form a sheet, are filled by a joint filling device 9 with binding agent. This device 9 is placed between the loading station 3 and the end 6 above the path of the supports 2 on the frame. After reaching the end 6, the supports 2 are moved in a direction perpendicular to their first direction of transport along the side 4 along the next side 10 of the frame. No rotation of the supports takes place during this change in the direction of movement. Between the ends of the side 10 there is a second joint filling device 11 attached to the frame 1 so as to be above the path of the supports. This second jointing device fills the other set of gaps 12 of the sheets with binding agent. The gaps 12 are perpendicular to the set of gaps 7. When the sheet of tiles arrives at the end 13 of the side 10 the tiles 8 are completely connected together. The supports 2 are now moved along the side 14 of the frame so that the sheets of tiles can be removed manually from the supports. The empty supports then move along the side 15 of the frame and pass again on to the side 4 and then arrive at the loading station 3. During the whole of their travel the direction of orientation of the supports is not changed, though the direction of movement is changed four times. The speed with which the supports are moved from the loading station 3 to the end 13 of side 10 is substantially constant. Along the sides 14 and 15 and along the side 4 as far as the loading station 3 the speed of movement of the supports may be less than that of the conveying means used for driving them, the conveying or transport means being suitably designed to allow this.

The main components of the frame 1 are parallel horizontal pieces of angle girder 16 and 17 so arranged that each has one limb horizontal and the other vertical. The upward horizontal limbs extend towards one another the upwardly extending vertical limbs are spaced from each other by a distance substantially equal to the length of the sides of the supports. The vertical limbs of the innermost angle girders 16 are cut away at the loading station 3 in order to enable the tiles to be slid on to the supports. The vertical limbs of the pieces of girder can also be cut away on side 14 in order to facilitate removal or unloading of the completed tile sheets.

The conveying or transport means for the supports on side 4 downstream from the loading station 3 and on side 10 of the frame comprises two endless chains 18 and 21 whose upper runs are arranged between the two angle girders 16 and 17. The chain 18 arranged on the side 4 moves the supports by means of entraining means 19, for example fingers, fixed to links of the chain. The entraining means fit into openings 20 in the supports which lie on the horizontal limbs of the pieces of angle girder extending from the loading station 3 to the end 6 of the side 4. The chain 21 moves the supports in the same manner on the side 10 as far as the end 13 of this side. The entraining means 19 have a distance between them which is greater than the length of the supports; preferably the spacing between successive entrainment means is twice this length. The speed of the two chains is the same. The operation of the chains and the distance between two adjacent entraining means are so selected that a support cannot be transported by the chain 18 into the transfer zone 22 at the corner between the sides 4 and 10 until the support coming before it has been conveyed by the chain 21 so as to be completely clear of the transfer zone. The upper runs of the two chains 18 and 21 lie and slide in U-shaped girders 23 whose limbs form lateral guide means for these runs. On the sides 14 and 15 and the section of side 4 upstream from the loading position 3 the conveying or transport means comprise three pairs of endless belts, as denoted by reference numerals 24, 25 and 26. The upper runs of these belts are also placed between the pieces of angle girder 16 and 17. The upper run of each belt slides on a guide rail 27 which is arranged at such a height on the frame 1 that the surfaces of the upper runs of the belts, on which the supports are carried, are at a higher level than the upper surfaces of the horizontal limbs of the pieces of angle girder. The guide rails 27 of the belts 26 extend to a position close to the loading station 3.

On transfer from the chain 21 to the pair of belts 24 a twisting force is exerted on the supports, as long as they are in engagement with the chain 21, owing to the movement of the belts 24. In order to prevent this twisting force actually turning the supports, the distance of the chain 21 from the angle girder 16 is less than its distance from the angle girder 17 so that the drive of the supports is carried out in such a manner as to oppose the twisting force exerted by the chain 21 on the support. In order to ensure that the supports 2 lie at the same level at each position of the apparatus, the horizontal limbs of the pieces of the angle girder 16 and 17 are provided with rails 28 on the side 4 extending upstream from the station 3 and on the side 10. The thickness of these rails is equal the difference in height between the upper surfaces of the belts 24, 25 and 26 and those of the horizontal limbs of the pieces of angle girder; the supports slide on the rails.

At the loading station 3 the supports 2 lie on the rails 28 and after loading with tiles are transported or conveyed in such a manner that they are propelled out of the loading station 3 by an empty support which is moved into the loading station 3 by the pair of belts 26. Preferably means are provided adjacent to and upstream from the loading station 3 in order to increase the friction between the supports and the belts 26 so that an empty support does not slide on the belts when it is to propel a loaded support out of the loading station 3. To this end, if the supports are made of a magnetisible metal, these means can comprise permanent magnets 29 mounted below the lower surface of the belts on the frame 1.

The supports 2 consist of strong plates 30 (see FIG. 1a and FIG. 4) which are engaged by the transport or conveying means. The supports also comprise upper trays 31 on which the tiles are laid. After the joints or gaps between the tiles have been filled with adhesive binding agent, the trays 31 are removed from the respective plates 30 and replaced by new ones.

As shown in FIGS. 1a, 1b and 4 there are three edge strips 32, 33 and 34 acting as abutments mounted on the plate 30. These strips abut against the edges of the tray 31. The height of the edge strips 32, 33 and 32 is slightly less than the sum of the thicknesses of the tray 31 and the tiles lying on it. The fourth side 35 of the plate is left unobstructed to allow the tiles to be slid on to the tray during loading. The edge strip 32 is cut away at three positions down to the top surface of the plate 30 so as to be aligned with the joints or gaps 7 in order to allow the passage of the nozzles here. The strip 32 is also cut away at the end nearest the top side of the paper in FIGS. 1a and 1b. The latter cut away portion serves to ensure that a downwardly projecting switch pin of a switch 36, shown in the top right hand part of FIG. 1b, is not actuated prematurely by the edge strip 32. This switch pin, which is bent in the direction of conveyance serves for controlling ejection of binding agent by means of a valve 37. The pin is moved upwards and actuated by the leading edge of the set of tiles. The cut away portion of the edge portion prevents the switch being actuated by this edge portion instead of by the tile. The position of the switch 36 is so chosen that switching on occurs shortly before the joints or gaps come to lie underneath the nozzles. The edge strip 34 is also cut away in the path of the switch 36 so that the squeezing or ejection of the binding agent is interrupted by the trailing tile edge exactly at that moment in which the gaps or joints 7 pass underneath the nozzles. The edge strip 34 serves to bring about a sharp interruption in the extruded strips of adhesive binding agent at the end of the joints at the end of extrusion into the joints or gaps 7. The edge strip 33 is provided with an abutment 38 which serves the purpose of holding the support in the loading station 3.

The automatic loading device 5 comprises three containers 39, placed side by side, in which the tiles are are stacked. The containers are parallel to the pieces of angle girder 16 and 17 of the side 4. They are separated from each other by pieces of sheet metal 40 having the thickness of the joints or gaps provided between the tiles. The three containers are open downwards in order to permit the passage of three tiles on to the support and on the other side to permit the passage of three plates 41 rigidly connected together. The plates can be moved in a direction perpendicular to the direction of transport or conveyance of the supports by means of a drive in a reciprocating fashion and can thus propel the tiles on to the support into their places. The thickness of the plates 41 is less than that of the tiles. The loading device 5 also includes a stop device 44 serving to stop the reciprocating movement of the three plates 41 after the loading of the supports and to start movement of the plates 41 again as soon as a new empty support arrives at the loading station 3. The loading station 3 is also provided with a holding means 42 for holding the supports during loading and for releasing the supports after loading. At the support station there are spacing means 43 which serve to maintain the correct gap or joint width between the tiles on the support.

The reciprocating movement of the plates 41 is brought about by means of a motor 45, as will be seen in FIG. 2, which operates via a step down gear arrangement 46 and a reversing transmission 47 which operates a shaft 48 parallel to the angle girders 16 and 17. The drive arrangement further includes two pulley wheels 49 and 50 keyed on the shaft 48. On the pulley wheel 49 one end 53 of a belt 51 is attached while the other end 52 of the belt is attached to the plates 41. On the pulley wheel 50 one end 56 of an elastic cord or rope 54 is attached whose other end is also attached on the plates 41. The belt 51 and the elastic cord 54 are wound in opposite directions on their pulleys. The elastic cord 54 runs over a guide pulley 57 which is journalled on a shaft 58 parallel to the shaft 48. The shafts 48 and 58, the pulley wheels 49 and 50, the freely running pulley 57, the belt 51 and the elastic cord 54 are so arranged that the edges 83 of the plates 41 can move from a position in front of the containers into a position behind the containers in which the edges 83 are removed from the edge strip 33 of the plate 30 by the breadth of a tile. The elastic cord 54 exerts its pulling force on the plates 41 against the action of a hydraulic dash pot 60 whose one end 61 is pivoted on a part 62 attached to the plates 41 and whose other end 63 is pivoted on the frame of the apparatus.

The aforementioned holding means 42 comprises a bolt or stud 64 which is pressed by a spring 66 shown in FIG. 2 into the path of the abutment 38 mounted on the strip 33 of the support and thus holds the support in the loading station 3. For withdrawing the bolt or stud against the force of the spring 66 out of the way of the abutment 38 use is made of an electromagnet 65, as shown in FIG. 2, which can be energised via a switch 67 which in turn is actuated by a part 68 of the spacing means 43. If the bolt or stud 64 is withdrawn away from the abutment 38 the loaded support can be pushed away by the following empty support. The renewed advance of the bolt 64 by means of the spring 66 into the path of the abutment 38 occurs as soon as the supply of current to the electromagnet 65 is interrupted again by the switch 67.

The spacing means 43, which is to set the gap width between the tiles mounted on the support, comprises strips or rails 69, 71 and 72 which in their working position are set so as to be perpendicular to each other and are cut away at their positions of intersection.

The strips or rails 69, 71 and 72 form a lattice which occupies during the loading phase strip-like areas on the support, where subsequently gaps are located. The strips 69, which run in a direction perpendicular to that of conveyance, are connected in a pivoting manner directly or indirectly with the vertical limbs of the outer pieces of angle girder 17 and connected together by means of a part 70, as can be seen in FIG. 3 and FIG. 1a. As a result the strips can be swung vertically simultaneously. The strips 71 and 72, which run parallel to the direction of conveyance are so pivoted on a beam 77 arranged on the inlet side of the loading station 30 that they can be swung individually in a vertical direction so that they can be laid progressively between the rows of tiles during loading. The beam 77 is arranged transversely over the frame 1. The strips 69 are driven by an electromagnet 73, see FIG. 2, which is controlled by means of a switch 74. The last-named switch 74, shown in the top part of FIG. 1a, is arranged downstream from the discharge side of the loading device 5 and the distance between the switch 74 and the edge 75 of a support held in the loading station 3 is less than the length of the side of the support. The switch 74 is actuated by means of a support when the latter is conveyed past it. In series with the switch 74 and the electromagnet 73 there is a hand operated switch 76, shown in the top part of FIG. 2. If the switch 74 is switched on or closed and the hand switch 76 has previously been closed by hand, the electromagnet 73 raises the strips 69 over the tiles which lie on the support held in the loading station 3. The strips 71 and 72 lie on the strips 69 and are raised simultaneously with them.

The part 68 rigidly connected with the strips 69 actuates the switch 67 during this raising movement and the switch causes the electromagnet 65 to be energised. The electromagnet then draws back the bolt or stud 64 so that it frees the abutment 38.

As can be seen in FIG. 3, in its raised position strip 71 is held by means of a pawl or latch 78, which can pivot about a pin 201, owing to the fact that a screw 202, rigidly connected with the strip 71, is mounted on the pawl or latch 78. The strip 72 is held in its upper position by means of a disc 79 owing to the fact that the pawl or latch 203 is mounted on the disc. The latter latch 203 is pivoted on a piece of sheet metal 204 rigidly connected with the strip 72 and the pawl 203 rests against a pin 205 attached to the piece of sheet metal 204. The disc 79 is mounted on a nearly upright shaft 206 which is journalled in parts rigidly connected with the beam 77 and pressed by a spring 207 into the position shown in FIG. 3. A further disc 208 mounted on the shaft 206 is aligned axially with the disc 79. The disc 79 extends for about three quarters of a circle, while an intermediate further disc 209 fills in the quarter of a circle left in the other two discs. At its lower end of the shaft 206 has a pivoting arm 210.

While the first row of tiles are propelled by the plate 41, with the strips 69 in the intermediate spaces 81, into their positions, the free end 82 (see FIG. 2) of a rod 80, which is rigidly connected with the plates 41 so as to be parallel to them, abuts against the pivoting arm 210 (Ref.: FIG. 3) so that the disc 79 is turned and the latch 203 falls on to the underlying disc 209. At the instant at which the first row of tiles come into their terminal positions, the rod end 82 strikes against the lower end of the pawl 78 and swings it. As a result the screw 202 is unlatched and the strip or rail 71 falls directly in front of the first row of tiles on to the support. When on the return movement of the plates 41 the rod 80 has run completely past the pivoting arm 210 (Ref.: FIG. 3), the discs are swung back by the spring 207 into their basic position and the latch 203 falls on to the lowermost disc 208. However, the strip or rail 72 always takes up a raised position. When the second of the row of tiles ejected from the containers by the plates 41 has reached its place, the pivoting arm 210 is swung by the rod end 82 again. The latch 203 now drops from the last disc 208 and the strip or rail 72 comes to lie directly in front of the second row of tiles on the support. Following this, the last row of tiles is advanced. On the raising of the strips 71 and 72 the previously described condition is assumed by the mechanism, the pawl 78 moving downwards owing to the weight of its lower limb back into its locking position with a swinging movement while the latch 203 can move upwards owing to a pivoting about its pivot point on the discs 208 and 79.

In order to hold the tiles in position during the raising of the strips 69, 71 and 72, the loading station is provided with at least one elastic tongue 84 which is only raised with strips 69 when the latter have vacated gaps or joints between the tiles.

The aforementioned stopping means 44, which arrests the plates 41 after completion of loading of a support and sets them in motion again for the loading of the next support, comprises two switches 85 and 86 shown in the top and centre parts of FIG. 1a respectively. The switches are connected in parallel electrically and control the motor 45 of the loading device by means of a relay which is not shown in the drawing. The switch 85 has a downwardly bent switching pin which is so arranged that it is pressed upwards by the tiles lying under it in the last row of tiles and the switch 85 is opened. The switch 85 remains in the open or switched off position until the loading station 3 has been completely vacated by the support which has been loaded. This is accomplished by the use of a projection 88 (see bottom part of FIG. 1a), mounted on the support 28 and extending from the edge strip 34 to the edge 89 of the plate 30. The projection 88 holds the switching pin of the switch 85 in an upper position even in the case of the last section of the plate 30. The switch 86 is so arranged that it is switched off or opened by a finger 87 attached to the pin or shaft 48 as soon as the plate 41 has returned for the third time into its end position in front of the containers. Owing to the switching off or opening of the two switches, the above-mentioned relay stops the motor 45 as soon as the support carrying tiles has completely vacated the loading station 3 and is replaced by an empty support; the switching pin of the switch 85 can move downwards so that the motor 45 is switched on again. The speed of operation of the loading device 5 is so set that the loading time is less than the time taken by the chains 18 and 21 to move through the distance between two adjacent entraining means 19.

The aforesaid joint-filling devices 9, 10 and 11 shown more especially in FIG. 4, and are provided with two extruding means which are aligned in relation to the pieces of angle girder 16 and 17. Extruding means 90 is mounted on the end of a rod 91 which is attached to a shaft 92 whose end is journalled in bearing blocks 93. The bearing blocks are mounted on cross-pieces 94 and 95 (see FIG. 4 and the right hand side of FIG. 16 respectively) mounted on the frame 1. A counterweight 96 is mounted on each of the two rods 91 so that it can be shifted in order to be able to regulate the pressing action of the means. In order to prevent excessive downward swinging movement of the means 90 on the movement past of a support covered with tiles, an abutment 97, which can be adjusted by means of a lead screw, is mounted on a part 99 connected with the cross parts 94 and 95. The abutment 97 is not shown in detail. Thus that section of the rod 91 comes to rest against the abutment which is between the means 90 and the shaft 92. For holding the tiles on the support during the supply of binding agent into the joints or gaps idler rollers 101 are provided which press on the tiles. The rollers 101 are mounted on the shafts which are perpendicular to the pieces of angle girders 16 and 17. These shafts are each mounted on the end of the strip 102 whose other end can be freely pivoted on a common shaft 103. The pressing of each of the rollers on the tiles is ensured by means of a rod whose one end engages the strip 102 and whose other end passes through a connecting piece 105 attached to the pieces of angle girder 16 and 17 and carries a weight 106; the weight adds to the effect exerted by the weights of the rollers, their shafts and the strips.

Each of the extruding means 90 is connected by an elastic tube 107 with a double acting piston and cylinder unit or ram 108, as shown in FIG. 7. One piston space of this cylinder is filled with a joint-filler binding agent which is pressurised at a constant value by oil on the other side of the piston, that is to say in the other piston space, of the unit 108. This side of the piston is supplied from a hydraulic unit 109. The hydraulic unit 109 continuously draws oil from a reservoir 110, forces it with a constant pressure through duct 113 to the piston cylinder unit 108 and forces superfluous oil through a return duct 111. As a result there is a constant oil circulation between the reservoir or container and the hydraulic unit which limits the oil pressure in the hydraulic unit and prevents oil in it overheating.

For filling the piston and cylinder unit or ram 108 with binding agent the following installation or arrangement is provided.

The piston cylinder unit or ram 108 is connected with a binding agent container 123 via a pressure duct 117 provided with a check valve 118, a suction duct 121 and a compressed air driven pump 116 which is arranged between the pressure duct 117 and the suction duct 121. The pump 116 is mounted at the top end of the duct 121 which has a disc-shaped piston at its lower end dipping into the binding agent container 123. A double acting pneumatic cylinder 120 has a piston rod 119 which is connected with the pump 116. Compressed air is introduced into the compressed air cylinder 120 and the pump 116 is driven so that binding agent is propelled through the suction duct 121 and the pressure duct 117 to one piston space of the ram 108 and the suction duct 121 with the disc-like piston 124 is moved down with a plunging movement further into the binding agent container 123. During this time a duct 112, which can be connected with the duct 113 by means of a slide valve 115, and leads back into the container or reservoir 110, allows a return of oil from the other side of the ram 108 into the container or reservoir 110. If the binding agent container 123 is empty, the other side of the pneumatic cylinder 120 is pressurised in order to raise the suction duct 121 and the piston 124 out of the container 123. Compressed air is supplied from a compressor 152.

As shown in FIG. 7, two of the means 90 are connected by means of an elastic duct 125 with the end of a compressed duct 126 which is connected with the electrically operated valve 37 adjacent to the jointing device 9. Means 90 at the filling device 11 are connected with an electrically operated valve 127; the valves 37 and 127 are connected with a compressed air duct 128 coming from the compressor 152. By supplying compressed air to the control means 90 the blinding agent is extruded. The electrically operated valve 37 is controlled by switch 36 (see top part of FIG. 1b) which is operated by a support passing under the means owing to its switching pin being raised by the support. As has already been mentioned the position of the switch 36 is so chosen that the switching off occurs shortly before the joints or gaps come clear the nozzles. This occurs approximately when the distance between the nozzle openings and the gaps or joints is a few millimeters. The electrically operated valve 127 for the filling device 11 is controlled by means of a photocell 129 (see right hand part of FIG. 1b) which is excited by a beam of light reflected from one of the tiles when a support with tiles passes underneath the jointing device 11. Between the photocell 129 and the electrically operated valve 127 there is an amplifier 130, as shown in the right hand part of FIG. 1b.

In order to facilitate the passage of supports from the chain 21 to the pair of belts 24 an auxiliary support device 131 is provided at the point of transition. Further corresponding support devices 131 serve to facilitate the passage of the supports from the pairs of belts 24 on to the pair of belts 25 and from the latter onto the pair of belts 26. The support arrangements 131 are in each case arranged between the two belts in question accepting the support. They comprise a lever 132 (see bottom left part of FIG. 1a) fixed to the pin 133 journalled in bearings fixed to the frame 1. The end 134 of the lever 132 extends nearly as far as the outer of the two belts between which the lever is arranged. A counter-weight 135 is arranged at the other end of the lever so that it can be shifted for adjustment. The section of the lever 132 between the pin 133 and the counter-weight 135 abuts against an adjustable abutment 136. By means of the latter the height position of the end 134 of the lever can be so set that the end of the lever lies at the same height as the upper face of the outer belt when no support is on the belt.

During the passage of the support the latter rests on the end 134 of the lever, the weight of the part of the support resting on the lever being increasingly balanced by the counter-weight. The position of the counter-weight 135 is so set that the upper face of the end 134 of the lever reaches the level of the upper face of the outer belt under the action of the opposing force of the support when the support has also come into a position above the belt. This avoids the support being pulled squew by the innermost of the two belts before it rests on the outer belt, i.e. end 134 lowers the support on the belts. Between the belts 25 there is a device 136' (see FIGS. 5 and 6) for holding the supports. This device serves to prevent an excessively large number of supports running onto a support which has passed onto the belts 26 and thus preventing the latter support from being moved any further. The device comprises two rods 138 and 139 which between the belts 25 are mounted on two pins 140 and 141 (journalled in carriers fixed to the frame 1) and a rail or batten 137 connecting the two rods 138 and 139. The upper end 142 of the rod 139 extends in its basic or starting position above the upper side or face of the belts 126. If a support abuts against it, the support presses the rod 139 downwards. As a result the rail or batten 137 forces the end 143 of the rod 138 into the path of the next support so that the latter is held and slides on the belts 25. The end 143 of the rod 138 comes out of the path of the supports as soon as the support pressing the end 142 of the rod 139 downwards can pass onto the belts 26 and releases the rod 139.

The chains 18 and 21 and the belts 24, 25, and 26 are driven via a step down gearing 145 from a motor 144 (see the top part of FIG. 1b). The movement of the motor is transmitted via a worm drive 148 to two shafts 146 (see right hand part of FIG. 1b) and 147 (see top part on the right of FIG. 1b), which drive the chains 18 and 21. The use of the worm drive avoids jerks in the movement of the chains.

The belts 24 are driven from the shaft 146 by means of a crossed driving belt 149 (see bottom right hand part of FIG. 1b) while the belts 26 are driven by means of an uncrossed driving belt 211 (see top part of FIG. 1b). The belts 25 are driven by means of a further crossed driving belt 150 (see top left hand part of FIG. 1a) and the worm drive 148 shown in FIG. 1b and the part of the shaft 147 extending to the left. The sprocket wheels of the chains and the pulley wheels for the belts are so dimensioned that at least the speed of the belt 26 is greater than that of the chains. The shaft 48 can be so set by means of a hand wheel that the belt 51 on the belt pulley 49 can be replaced. The motor 144 is preferably provided with a speed regulator so that the speed of the chains and the belts can be controlled precisely.

The apparatus is started as follows.

In the stationary position an empty support is at the loading station 3 upstream from the loading device 5. If a switch 100 (see central part of FIG. 1b) which is connected in series with the switches 85 and 86 for the relay controlling the motor 45, is switched off or opened, the motor does not run.

For starting the apparatus the switch 100 is switched on and, as soon as the switch 85 is closed, starts the motor 44 by operation of the relay. The loading device then functions and loads the support held at the loading station 3. The pump 114 is switched on and thus pressurises the binding agent in the cylinder. The compressor 152 is switched on in order to supply the means 90 compressed air. The switch 76 is left switched off, that is to say open, so that the support is held fixed in position upstream from the loading device 5. The drive motor 144 for the chains and the belts is switched on. As soon as the person operating sees an entraining means 19 on chain 18 come into a position close to the loading station 3, a service switch and a switch 74 connected in series with it are closed. The support held at the loading station is thus released and pushed onwards by the following empty support. The operator then switches off or opens the switch 74 again and thus allows the loading of the empty support which is now the loading station. The loaded support remains in position until an entraining means 19 comes up to it to convey it further, the switch 74 remaining open until the support has moved past it. At that moment at which the switch 74 is clear of the support, it is closed and allows the next support lying in the loading station 3 to be released.

Figure 8:
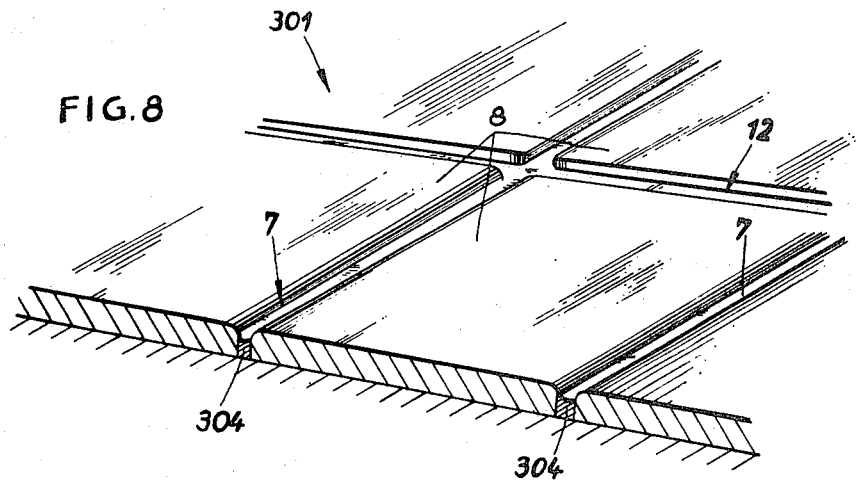
FIG. 8 is a section of a sheet of tiles assembled in accordance with the invention.

A section of a finished sheet 301 of tiles is shown in FIG. 8 In this figure reference numeral 304 denotes the binding agent or cement in the gaps or joints 7 and 12 between the tiles 8.

Figure 9:
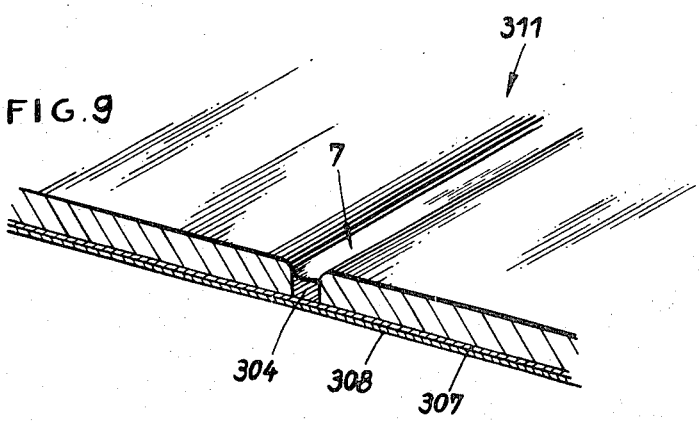
FIG. 9 is a section of a modified sheet of tiles in accordance with the invention.

FIG. 9 shows a section of a sheet 311 of tiles which on its rear side or face is provided with a layer of adhesive 307 and a protective foil 308 overlying this layer.

A large number of variations can be made in the apparatus described above by way of further embodiments without departing from the scope of the invention. For example a support can be laid on a horizontal plate which can be turned through 90° about a vertical axis owing to the provision of suitable bearing means. In this case a jointing device first operates parallel to one set of joints and then parallel to the other set of joints after the rotation through 90° about a vertical axis.

I claim:

1. An apparatus for joining tiles together to form sheets of tiles, comprising:

plane supports for carrying tiles to be formed into a sheet of tiles;

guide means extending in a horizontal direction for moving said supports horizontally;

conveyor means associated with the guide means for moving the supports along the guide means;

a loading device for loading tiles on the supports and arranged for laying the tiles in arrays in which they are adjacent to each other in rows running in at least two directions, the guide means running in at least two different horizontal directions and being arranged to pass the supports from the loading device and then back to the loading device; and means to transport said supports on the guide means in such a manner that a given side of each support remains parallel to a given horizontal axis, and each support retains its orientation while moving on the guide means from one horizontal direction to a second horizontal direction;

and stationary devices for filling binding agent in gaps between the tiles on the support, wherein the guide means are arranged to convey the supports with the tiles on them along a path which is rectangular in plan, the loading device being arranged adjacent a first side of this rectangle, and wherein said stationary devices for filling binding agent comprise a first device arranged on one side of the rectangular path and a second device arranged on a second side of the rectangular path which second side is at right angles to said first side, so that the first and second stationary filling devices fill the binding agent in two sets of joint-gaps in tiles arranged on the support, which gaps are at right angles.

2. An apparatus in accordance with claim 1 in which the guide means comprises pairs of parallel pieces of angle girder with horizontal and vertical limbs, the horizontal limbs of the two pieces of girder in each pair extending towards each other, the pieces of angle girder being spaced apart by a distance substantially equal to the width of the supports transported on them.

3. An apparatus in accordance with claim 2 in which said conveyor means comprise endless chains arranged between the pieces of angle girder of each pair, the apparatus further comprising entrainment means attached on the chains and extending above the pieces of angle girder and adapted for engaging the supports.

4. An apparatus in accordance with claim 3 further comprising longitudinal members of U cross-section in which upper runs of the chains are contained.

5. An apparatus in accordance with claim 3 in which upper runs of the endless chains are at a higher level than upper faces of horizontal limbs of the pieces of the angle girder.

6. An apparatus in accordance with claim 5 comprising common drive means for the transport means, the transport means being adapted to run at the same speed along all the sides of the rectangle defined by the guide means.

7. An apparatus in accordance with claim 5 in which the transport means are arranged to propel the supports at a position adjacent to and upstream from the loading device faster than the speed along the other sides of the rectangle, the speed on these other sides being equal.

8. An apparatus in accordance with claim 7 in which said entrainment means provided on the chains have projections wherein a spacing between successive projections is greater than twice the length of the side of a support in the transport direction.

9. An apparatus in accordance with claim 8 comprising:
an auxiliary support device at a stage of transition of a support means from one horizontal direction to a second horizontal direction of the guide means, the auxiliary support comprising a lever which is mounted in a position between two chains at their upstream ends, the lever being mounted between the chains for swinging about a pivot axis parallel to the chains;

and an adjustable weight mounted on the lever, the lever serving for holding the supports up clear of the chains and then lowering the supports on to the chains as the supports come to lie over the chains and their weight overcomes the upward force tilting the lever provided by the weight on the lever.

10. An apparatus in accordance with claim 9 comprising, in that side of the rectangle which is upstream from and adjacent to the side with the loading device, a first abutment which can be displaced by a support out of the path of the support;

and a second abutment which is so arranged and coupled with the first abutment that by the above-mentioned displacement of the first abutment it is brought into the path of the support to act as a blocking means.

11. An apparatus in accordance with claim 10 in which the loading device for loading supports with tiles is arranged to load the supports while they are on the guide means and immediately upstream from the loading device, the apparatus further comprising an abutment adjacent to the loading device for holding back the supports.

12. An apparatus in accordance with claim 11, comprising, upstream from the loading device, a device for pressing a support on to the chains.

13. An apparatus in accordance with claim 12 wherein the supports are made of a magnetizable material and in which the device for pressing the supports on to the chains comprises magnetic means.

14. An apparatus in accordance with claim 11, further comprising:
a pushing means for loading tiles on to supports, the pushing means extending to one side of the guide means; a first set of parallel rails extending in the direction of pushing of the pushing means, the rails in this set being capable of being lowered on to one support, the breadth of the rails defining gaps between the tiles, the clearance between the rails being equal to a length of each tile; a second set of parallel rails perpendicular to the first rails having a breadth defining gaps between the tiles and a clearance between them equal to a width of each tile, the second set of rails being capable of being moved sequentially down on to one such support so that the two sets of rails intersect, the rails being cut away at the points of intersection.

15. An apparatus in accordance with claim 14 in which the first set rails are rigidly connected together.

16. An apparatus in acordance with claim 15 in which the first set of rails and the second set of rails are pivoted at positions removed from the position taken up by a support during loading.

17. An apparatus in accordance with claim 16 in which there are two rails in the second set of rails and the apparatus comprises:
three cam means for moving said two rails of the second set of rails into three different raised positions; a substantially vertical shaft on which the cam means are mounted; an arm mounted on the shaft;
a rod coupled with the arm for cooperation with said pushing means, and;
a further abutment for holding one of the first set of rails in the raised position and holding one cam of said cam means, the abutment being arranged to drop by a first movement of the shaft from one of the cam means which is above the other two cam means, on to one of the cam means which is between the other two cam means, and on a following movement of the shaft in the opposite direction to the first movement, drops on to the cam means which is below the other two cam means while on a second movement in the same direction as the first movement the abutment drops from the middle cam means, an end of said rod and the arm being arranged at such positions that the aboutment drops from the middle cam means when a last row of tiles has been pushed into position on to a support by the pushing means.

18. An apparatus in accordance with claim 17 in which cut away portions of the uppermost and the lowermost of the cam means take up about a quarter of a circle and the cam means between the other two cam means is substantially aligned only with these cut away portions.

19. An apparatus in accordance with claim 17 further comprising: a further rod and a latch for coupling the further rod with the pushing means and serving for coupling the rail further removed from the pushing means, the latter rail being capable of being held in a raised position, an end of the further rod and the latch being arranged at such positions that the latch is unlatched when a first row of tiles has been pushed by the pushing means into position on one support.

20. An apparatus in accordance with claim 19 in which said further abutment is in the form of an angle lever which is adapted to be moved by the cam means on raising of the rail, in which the abutment can move along the cam.

21. An apparatus in accordance with claim 20 comprising an electromagnet which can move the first set of rails upwards sufficiently to allow the transverse rails, which are also moved upwards on pivoting movement, to move into a raised position.

22. An apparatus in accordance with claim 21 comprising a further electromagnet for retracting the abutment for holding the supports in the loading position back out of position, a switch for controlling this electromagnet, the switch being arranged to be actuated by raising of the rails.

23. An apparatus in accordance with claim 22 comprising a switch for controlling drive means for raising the rails, this switch being capable of being actuated by one of the supports which has already been moved away from the loading device.

24. An apparatus in accordance with claim 23 comprising a tongue for holding the tiles on the raising of the rails, the tongue being connected with the rails in such a manner that it is entrained by the latter when it comes clear of the tiles.

25. An apparatus in accordance with claim 24 wherein the supports are rectangular, comprising edge strips arranged on the edges of the supports, one edge of each support being left free for the horizontal discharge of tiles from the support, at least one of the edge strips having recesses aligned with joint gaps between tiles on the support.

26. An appaartus in accordance with claim 25 comprsing a switch pin for control of the device for filling binding agent into joints, two parallel edge strips being cut away to allow for relative movement between them and the switch pin.

27. An apparatus in accordance with caim 26 in which each support comprises a plate and a tray arranged on top of it in such a manner that the tray cannot move in relation to it, the tray being capable of being removed from the plate.

28. An apparatus in accordance with claim 27 in which the edge strips are fixed to the plate and are slightly lower in height than tiles on the tray.

29. An apparatus in accordance with claim 28 comprising a plurality of extruding means, forming part of the stationary device for filling binding agent in the joints, the extruding means aligned together in a straight line perpendicular to the transport direction of the tiles, and means for controlling operation of the extruding means in accordance with the position of the support.

30. An apparatus in accordance with claim 29 comprising a swinging lever which is placed at right angles to the direction of transport of the supports and carries the extruding means,, the lever comprising a further arm; an adjustable counter-weight arranged on this further arm, an adjustable abutment for limiting movement of the lever arm on which the extruding means are mounted.

31. An apparatus in accordance with claim 30 comprising rollers mounted along a straight line adjacent to the extruding means for pressing the tiles on to the supports.

32. An apparatus in accordance with claim 31 comprising a chamber for feeding the extruding means with compressed air pressurising them.

33. An apparatus in accordance with claim 32, wherein each extruding means comprises a piston cylinder unit which is filled with binding agent on one side of its piston connected with the extruding means, while the other side of its piston is arranged to be pressurized.

34. An apparatus in accordance with claim 33 comprising a pump connected with the side of the cylinder opposite to the side containing the binding agent, a reservoir for hydraulic liquid, a suction duct and a overflow or return duct connected with the reservoir.

35. An apparatus in accordance with claim 34 comprising a duct, a check valve in the duct, a pump, a hollow piston rod, and a binding agent container connected with the side of the piston cylinder unit with this binding agent, the apparatus also comprising a piston mounted on the piston rod for closing the binding agent container.

36. An apparatus in accordance with claim 35 comprising a device for pressing the piston into the binding agent container.

References Cited

UNITED STATES PATENTS

| | | | |
|---|---|---|---|
| 3,238,589 | 3/1966 | McClarney | 264—261 X |
| 3,203,069 | 8/1965 | Wogulis et al. | 264—261 X |
| 3,239,981 | 3/1966 | Fitzgerald | 264—261 X |
| 3,516,117 | 6/1970 | Shockley | 18—4 P |
| 2,576,366 | 11/1951 | Smith | 214—8.5 F X |
| 2,970,413 | 2/1961 | Miklosek | 51—240 |
| 3,266,616 | 8/1966 | Thomas et al. | 198—85 |
| 2,227,145 | 12/1940 | Lex et al. | 198—19 |
| 1,861,659 | 6/1932 | Fox | 104—48 |

J. SPENCER OVERHOLSER, Primary Examiner

D. S. SAFRAN, Assistant Examiner

U.S. Cl. X.R.

425—109, 114, 383, 146, 174